(12) United States Patent
Taieb (10) Patent No.: US 6,755,194 B2
(45) Date of Patent: Jun. 29, 2004

(54) STOWAGE SYSTEMS, PARTICULARLY FOR OXYGEN MASKS

(75) Inventor: Denis Taieb, Beverly Hills, CA (US)

(73) Assignee: Intertechnique, S.A. (FR)

( * ) Notice: Subject to any disclaimer, the term of this patent is extended or adjusted under 35 U.S.C. 154(b) by 0 days.

(21) Appl. No.: 10/118,726

(22) Filed: Apr. 9, 2002

(65) Prior Publication Data

US 2003/0188989 A1 Oct. 9, 2003

(51) Int. Cl.$^7$ .............................................. A62B 18/08
(52) U.S. Cl. ........................... 128/206.27; 128/200.24; 128/204.18; 128/205.25; 220/827; 220/832
(58) Field of Search ....................... 128/206.27, 205.25, 128/204.18, 206.21, 206.22, 206.23, 206.24, 200.24, 202.27; 202/263, 264; 220/827, 833, 837, 811, 812, 813, 831, 832, 345.2, 345.4

(56) References Cited

U.S. PATENT DOCUMENTS

| | | | | |
|---|---|---|---|---|
| 2,086,534 A | * | 7/1937 | Byrne | 220/811 |
| 2,931,355 A | * | 4/1960 | Miller et al. | 128/204.29 |
| 4,154,237 A | * | 5/1979 | Courter | 128/206.27 |
| 4,241,833 A | * | 12/1980 | Luebcke | 206/570 |
| 4,260,070 A | * | 4/1981 | Pierson | 43/55 |
| 4,481,945 A | * | 11/1984 | Levine | 128/206.27 |
| 4,609,166 A | * | 9/1986 | Brennan | 244/118.5 |
| 4,710,756 A | * | 12/1987 | Thornburg et al. | 340/628 |
| 4,840,171 A | * | 6/1989 | Rohling et al. | 128/204.18 |
| 4,909,247 A | * | 3/1990 | Terrisse et al. | 128/206.27 |
| 5,156,291 A | * | 10/1992 | Mielke | 220/254.5 |
| 5,385,259 A | * | 1/1995 | Bernstein et al. | 220/495.11 |
| 5,664,566 A | | 9/1997 | McDonald et al. | 128/205.25 |
| 5,816,244 A | * | 10/1998 | Aulgur | 128/206.27 |
| 5,954,052 A | * | 9/1999 | McDonald et al. | 128/206.27 |
| 5,957,132 A | | 9/1999 | McDonald et al. | 128/207.11 |
| 6,526,967 B2 | * | 3/2003 | Cordero et al. | 128/200.24 |
| 2002/0189617 A1 | * | 12/2002 | Cordero et al. | 128/205.25 |

FOREIGN PATENT DOCUMENTS

WO    WO 90/02582    *    9/1990

* cited by examiner

Primary Examiner—Henry Bennett
Assistant Examiner—Andrea M. Ragonese
(74) Attorney, Agent, or Firm—Dean W. Russell; Kilpatrick Stockton LLP (57) ABSTRACT

Stowage systems having boxes with covers are addressed. Exemplary systems include mechanisms for biasing covers toward their closed positions and for blocking, or maintaining, covers in their open positions when necessary or desired. Such systems are particularly (although not exclusively) useful for cockpit storage of oxygen masks, where open covers might impede use of certain flight controls during aircraft operation but facilitate removal or reinsertion of the masks by a mechanic when the aircraft is not operating.

14 Claims, 8 Drawing Sheets

STOWAGE SYSTEMS, PARTICULARLY FOR OXYGEN MASKS

FIELD OF THE INVENTION

This invention relates to stowage systems, particularly (but not exclusively) for oxygen masks, and more particularly (but again not exclusively) to stowage boxes in which oxygen masks for aircraft crew members may be stored when not in use.

BACKGROUND OF THE INVENTION

Numerous styles of oxygen masks presently exist. One type, denoted the "quick-donning" variety, typically includes a breathing regulator, a pneumatically-controlled harness, and optionally an optical lens and microphone and may be adapted for donning, typically using only one hand of the wearer, in less than five seconds. This sort of rapid functioning may be necessary to protect flight crew members (or other personnel) from adverse affects of depressurization, smoke, or other eye or lung irritants.

The Eros MAGIC mask is an example of such quick-donning equipment. Another example is described in U.S. Pat. Nos. 5,664,566 and 5,957,132 to McDonald, et al. (collectively "the McDonald patents"). As noted in the McDonald patents, "[p]rovisions for stowage of the mask must be sensitive to both the quick-donning requirements and the very limited space and volume available in the aircraft flight decks." The McDonald patents additionally note that these masks often are desirably placed "in a position close to and convenient to the crewmember when he or she is seated at his or her station." See, e.g., McDonald '566, col. 1, ll. 28–34.

FIGS. 2 and 3 of the McDonald patents illustrate, somewhat schematically, sample storage boxes for oxygen masks. More typically, however, the storage boxes have one or more doors, or covers, intended to protect the stowed masks when not in use. Alternatively referred to as "lids" in various brochures for Eros products, these doors or covers often are designed both to permit easy extraction of the masks within the boxes and to facilitate testing of the operational capabilities of the regulators without having to remove the masks from the boxes.

Storage boxes, especially those intended for flight deck use, additionally are constrained not to interfere with proper operation of their associated aircraft. Accordingly, if the covers of a storage box remain open after a mask is donned, they advantageously should not impede use of any aircraft equipment. This is particularly problematic for some Boeing 757 aircraft, where placement of some storage boxes may cause their covers, when open, to hinder maneuvering of certain aircraft flight controls.

Likewise, absent any closing bias on the box covers, once opened by a mechanic, for example, to reinsert a mask into a box, the covers remain open. This result could, at least theoretically, assist mechanics in replacing masks using only two hands. However, it also creates potential to cause damage to the covers if they are improperly blocked open and subsequently forced close.

SUMMARY OF THE INVENTION

The present invention seeks to resolve some of these issues by providing stowage systems designed to avoid having container covers impede flight equipment when the covers are open. The systems additionally permit the covers to be blocked, or latched, open when appropriate as, for example, to facilitate reinsertion of masks into associated storage boxes. Further, the latching mechanism may be designed so as not to suffer damage if the covers are forced closed improperly.

Some embodiments of the innovative systems may incorporate covers biased to close following opening. The closing bias may be provided in any suitable manner, although preferably using a twisted spring positioned at or near the pivot axis of its corresponding cover. In this preferred approach, the static end of the twisted spring may be designed to contact the casing of the storage box, while the dynamic end of the spring contacts the cover.

Embodiments of the systems additionally may permit translation of the covers along their pivot axes. In these embodiments, translating open covers may cause curved spring blades mounted on the casing to contact teeth present on the covers. The force applied by the blades counteracts that of the twisting springs, thus maintaining the covers in the open position. Sliding the covers back along their pivot axes allows the springs to resume their function and facilitate closure of the covers. As well, if the curved blades are chosen to be sufficiently flexible, the teeth can escape them without damage should someone attempt to close a cover improperly.

Any or all of the above-described features may be present in embodiments of the present invention. The invention is not limited to any particular embodiment described or illustrated in this application, but rather encompasses both these embodiments and all others discernable to those skilled in the appropriate field upon reviewing this application. In particular, systems of the present invention need not necessarily be employed on flight decks or by flight crews, but rather may be utilized in any suitable location or by any appropriate personnel.

It thus is an object of the present invention to provide systems for stowing equipment such as, but not necessarily limited to, oxygen masks.

It is also an optional object of the present invention to provide stowage systems including covered containers and in which the covers may be biased closed.

It is further an optional object of the present invention to provide stowage systems for use on flight decks or by flight crews or in areas where space is limited.

It is an additional optional object of the present invention to provide stowage systems in which covers of containers may be blocked, or latched, open to facilitate insertion or removal of equipment contained within the containers.

It is yet another optional object of the present invention to provide stowage systems in which the blocking, or latching, mechanism may be chosen so as to reduce the possibility of damage should covers be forced closed improperly.

Other objects, features, and advantages of the present invention will be apparent to those skilled in the appropriate art with reference to the remaining text and the drawings of this application.

DETAILED DESCRIPTION

Figure 1:
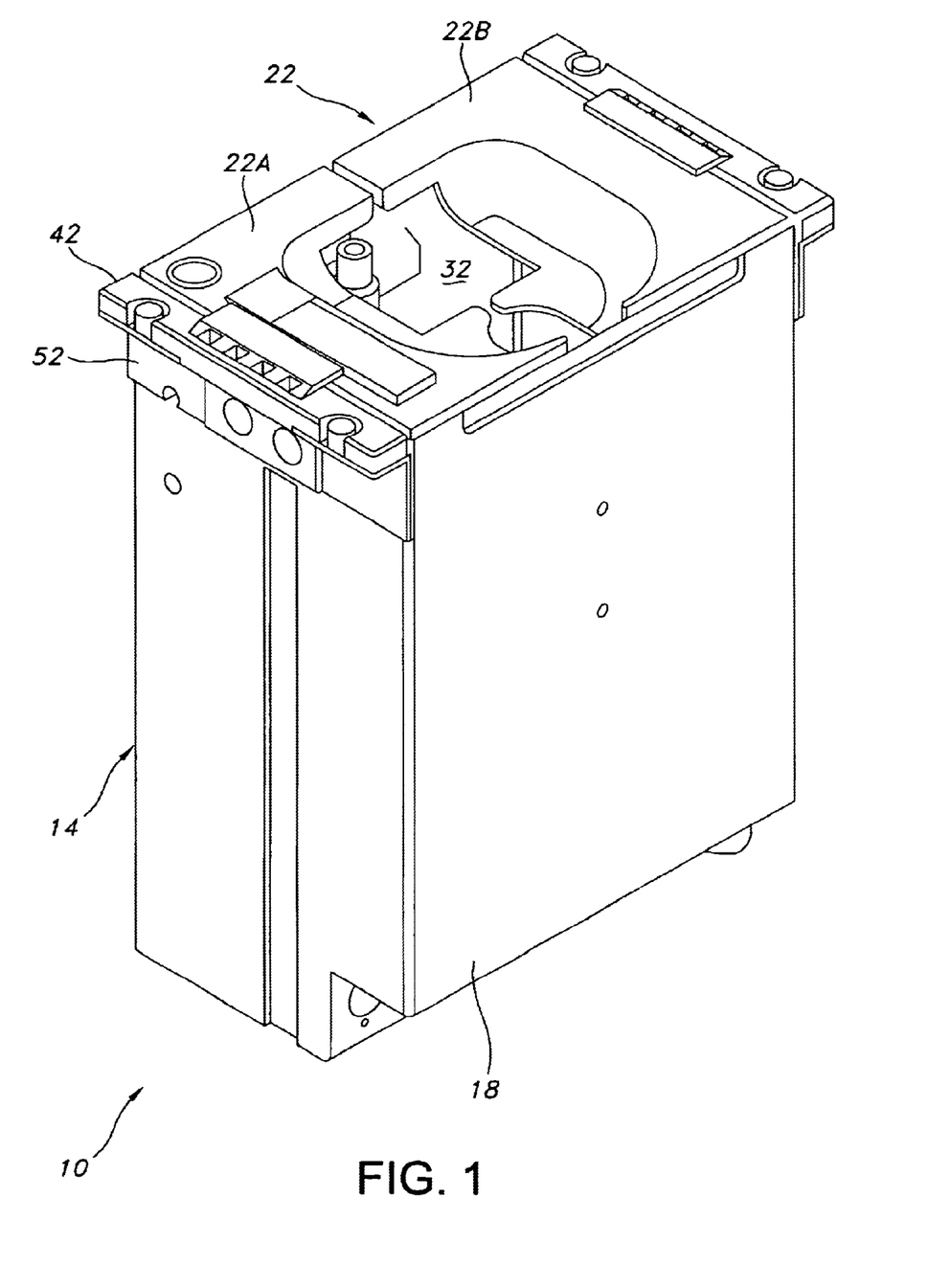
FIG. 1 is a perspective view of an exemplary stowage system of the present invention.
Figure 2:
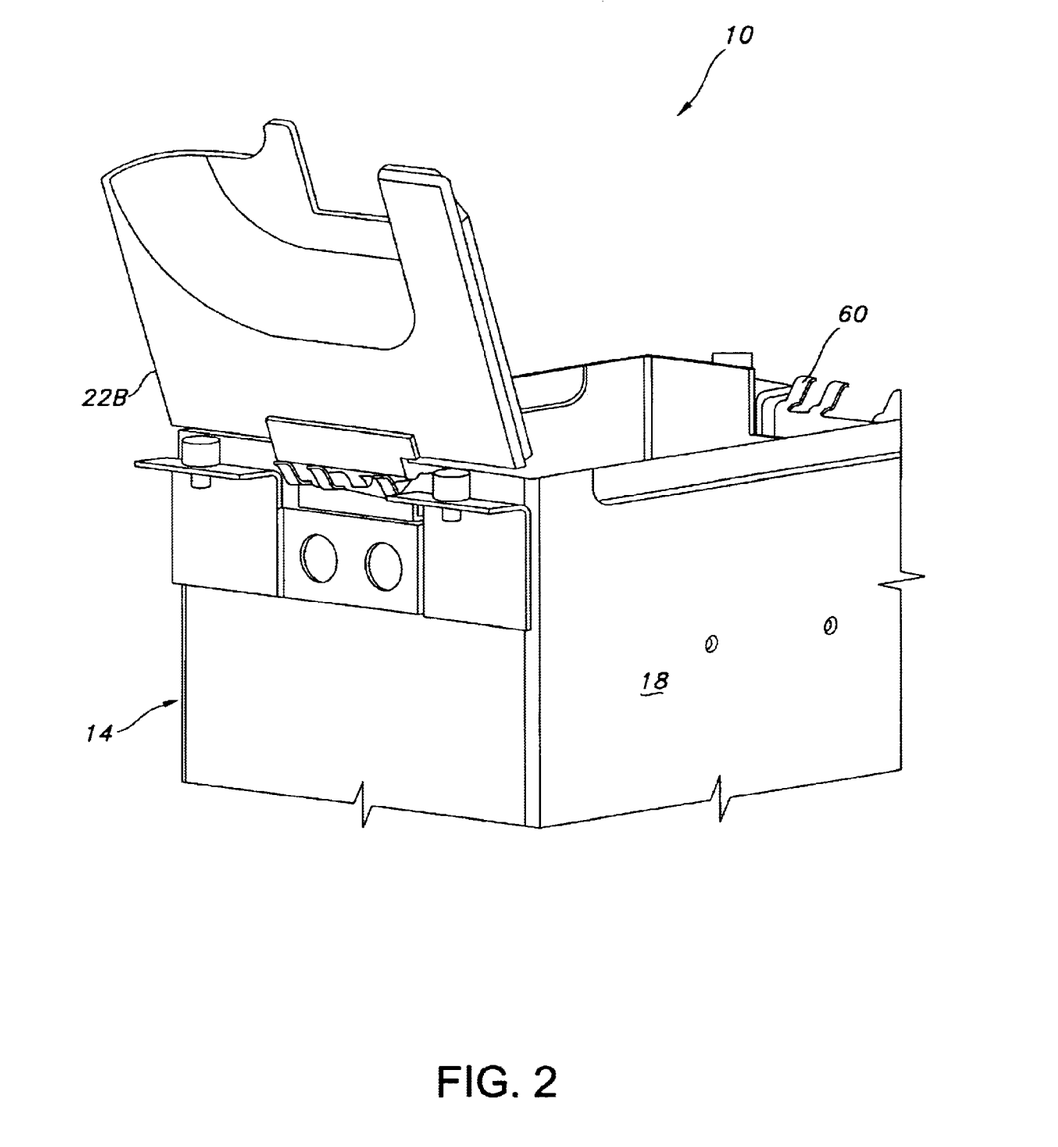
FIG. 2 is a perspective view of a portion of the stowage system of FIG. 1 with the left door open and the right door removed.
Figure 3:
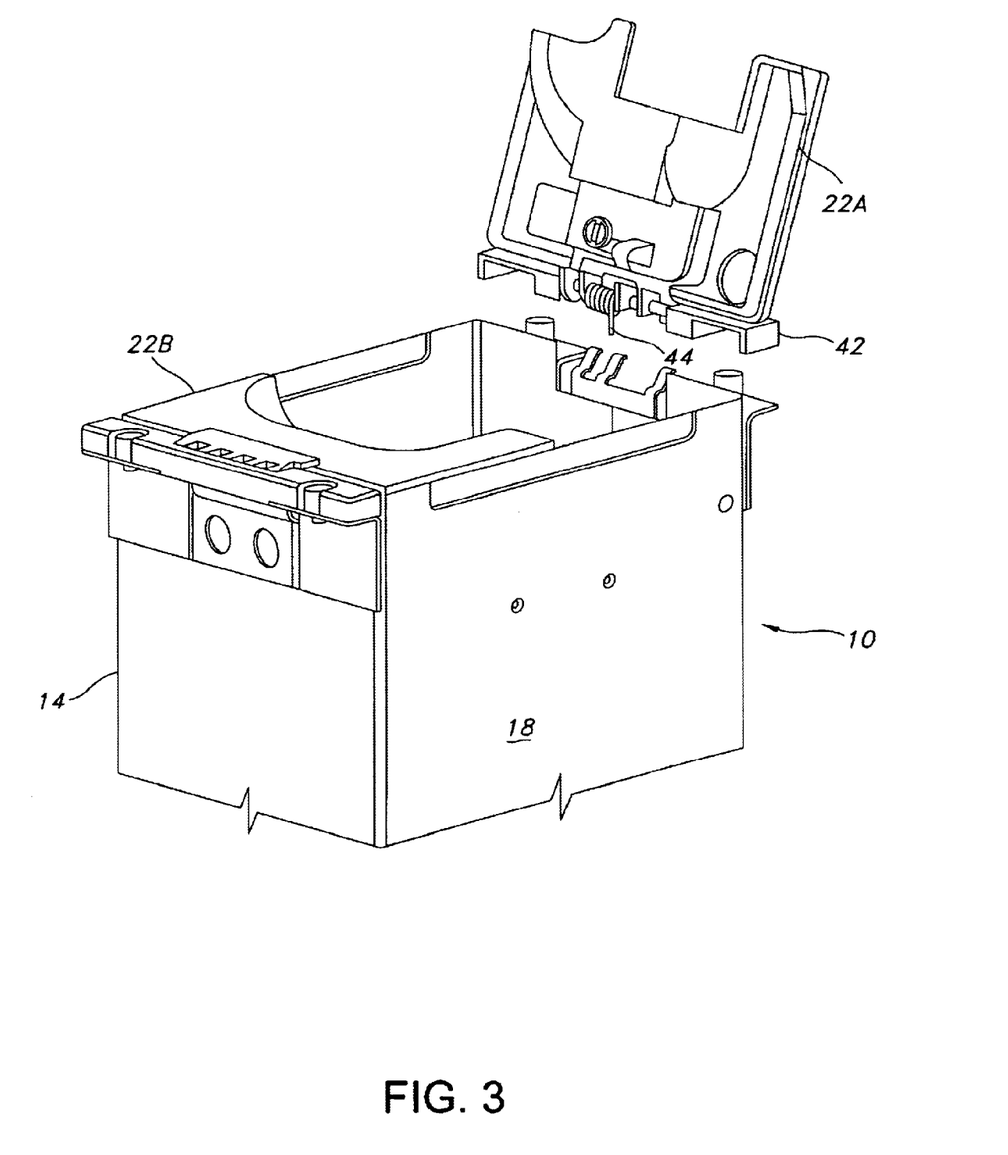
FIG. 3 is a partially-exploded perspective view of a portion of the stowage system of FIG. 1.

FIGS. 1–3 illustrate exemplary stowage system 10 of the present invention. As detailed in these figures, system 10 may include a container, such as box 14, comprising casing 18 and cover 22. Box 14 is especially well suited for housing a quick-donning oxygen mask, although other oxygen masks, and indeed equipment other than oxygen masks, could possibly be contained within box 14 instead. Likewise, although box 14 is depicted as having generally rectangular cross-section, other container types and shapes may be employed.

Box 14 optionally may include connections to a source of oxygen or other breathable gas and to electrical or communications lines. These optional features of system 10 may be advantageous when the system 10 is utilized in the cockpit of an aircraft with box 14 housing an oxygen mask. Further, if the mask is of the quick-donning variety, both the regulator and harness may be connected to the oxygen source, permitting the same gaseous flow both to inflate the harness and to provide breathable gas to the wearer.

In the embodiment of system 10 shown in FIGS. 1–3, cover 22 contains two doors, or sections, 22A and 22B. Each section 22A or 22B may connect to casing 18 in a manner permitting its pivoting outward, away from the interior volume of box 14. When closed, sections 22A and 22B collectively define an opening 32 from which at least the regulator of an oxygen mask may protrude. Such protrusion permits the regulator to form a grasping surface for a wearer, who by grasping the regulator may pull the mask out of the interior volume of box 14 for use. Because portions of the mask are larger than opening 32, when the wearer pulls the mask through the opening 32, sections 22A and 22B necessarily pivot outward to expose the entire inner volume of box 14. FIG. 2 depicts section 22B as so pivoted, while FIG. 3 illustrates section 22A pivoted outward and section 22B in its unpivoted position.

Unlike conventional mask-stowage systems, system 10 includes a mechanism for biasing cover 22 to its closed position, in which sections 22A and 22B are unpivoted. Hence, after the wearer pulls a mask through opening 32, sections 22A and 22B will tend to return to the state depicted in FIG. 1. An exemplary mechanism for accomplishing this result includes twisted spring 36 and axle 40, each shown in FIGS. 3–5. Of course, those skilled in the relevant art will recognize that other biasing means may be used instead of or in addition to spring 36 and axle 40, so that the biasing mechanism of the invention neither necessarily requires nor is limited to either or both of these particular components.

Figure 4:
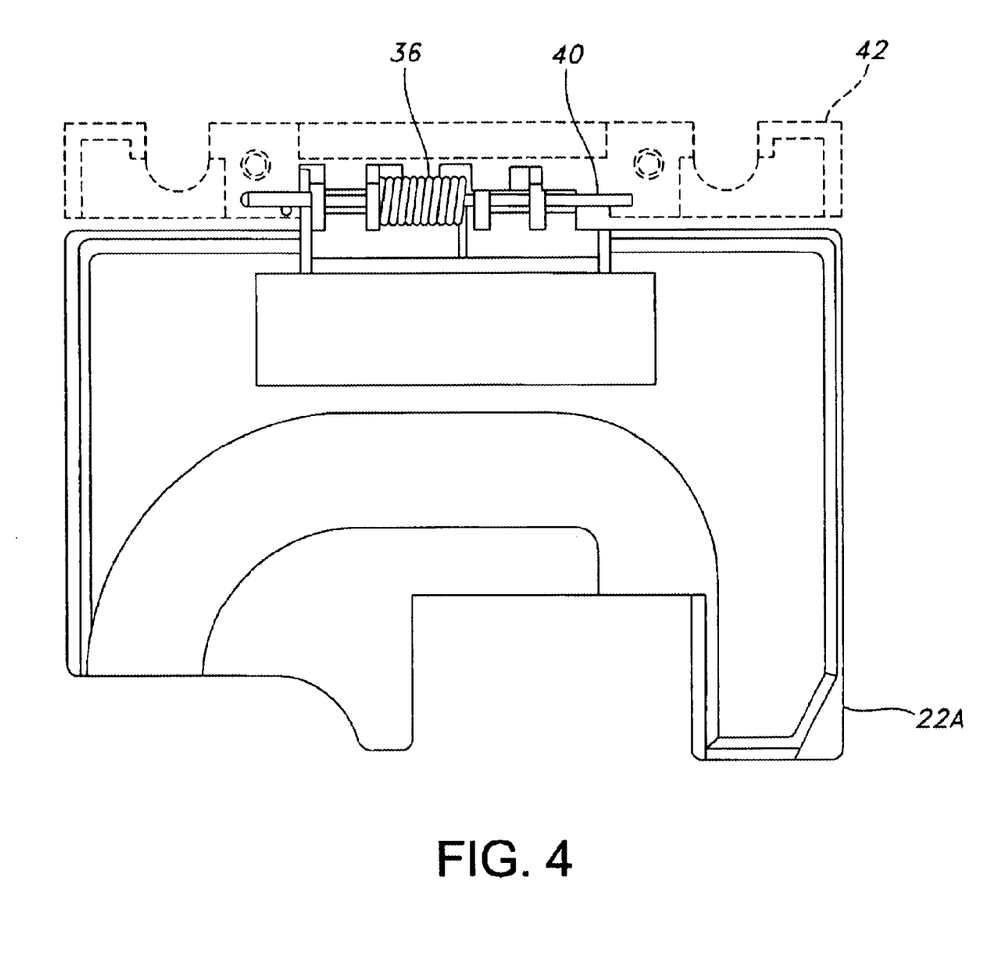
FIG. 4 is a plan view of a cover of the stowage system of FIG. 1.
Figure 5:
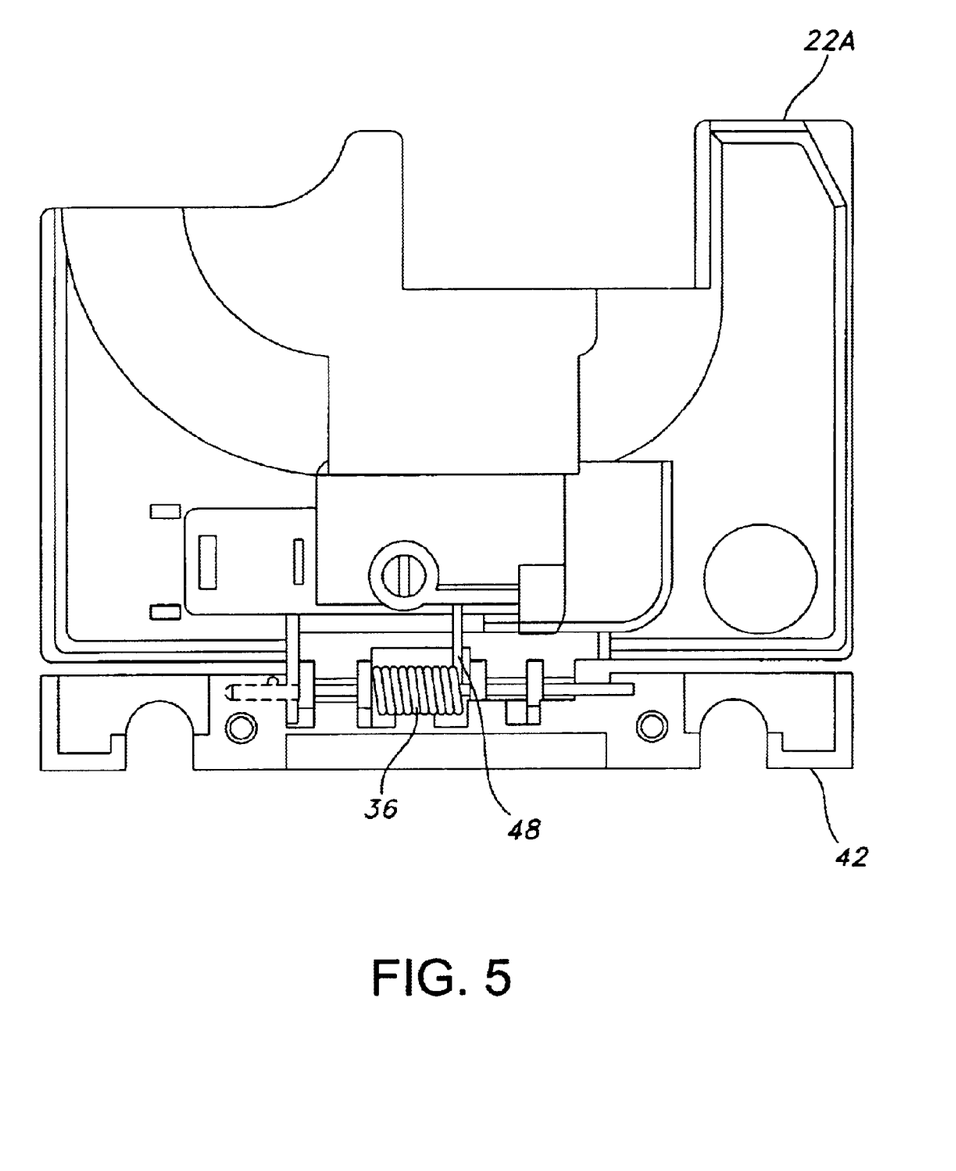
FIG. 5 is a plan view of the underside of the cover of FIG. 4.

Nevertheless, assuming spring 36 and axle 40 are present, one set of each preferably connects to each of sections 22A and 22B of cover 22. FIGS. 3–5 shows one such set of spring 36 and axle 40 for use with section 22A. In these embodiments of system 10, axle 40 is captured by section 22A and base 42 in a manner permitting it to rotate freely, while spring 36 circumscribes a portion of axle 40. Spring 36 includes both static end 44 and dynamic end 48, the former of which pushes on casing 18, while the latter pushes on section 22A.

When base 42 is connected to flange 52 (which in turn is connected to casing 18), section 22A may pivot about an axis coincident with axle 40 so as to open and close. However, because of the force supplied by spring 36, section 22A tends to want to return to its unpivoted condition. Utilizing a similar mechanism in connection with section 22B may cause it too to tend to return to its unpivoted condition, thus closing cover 22 as shown in FIG. 1.

Figure 6:
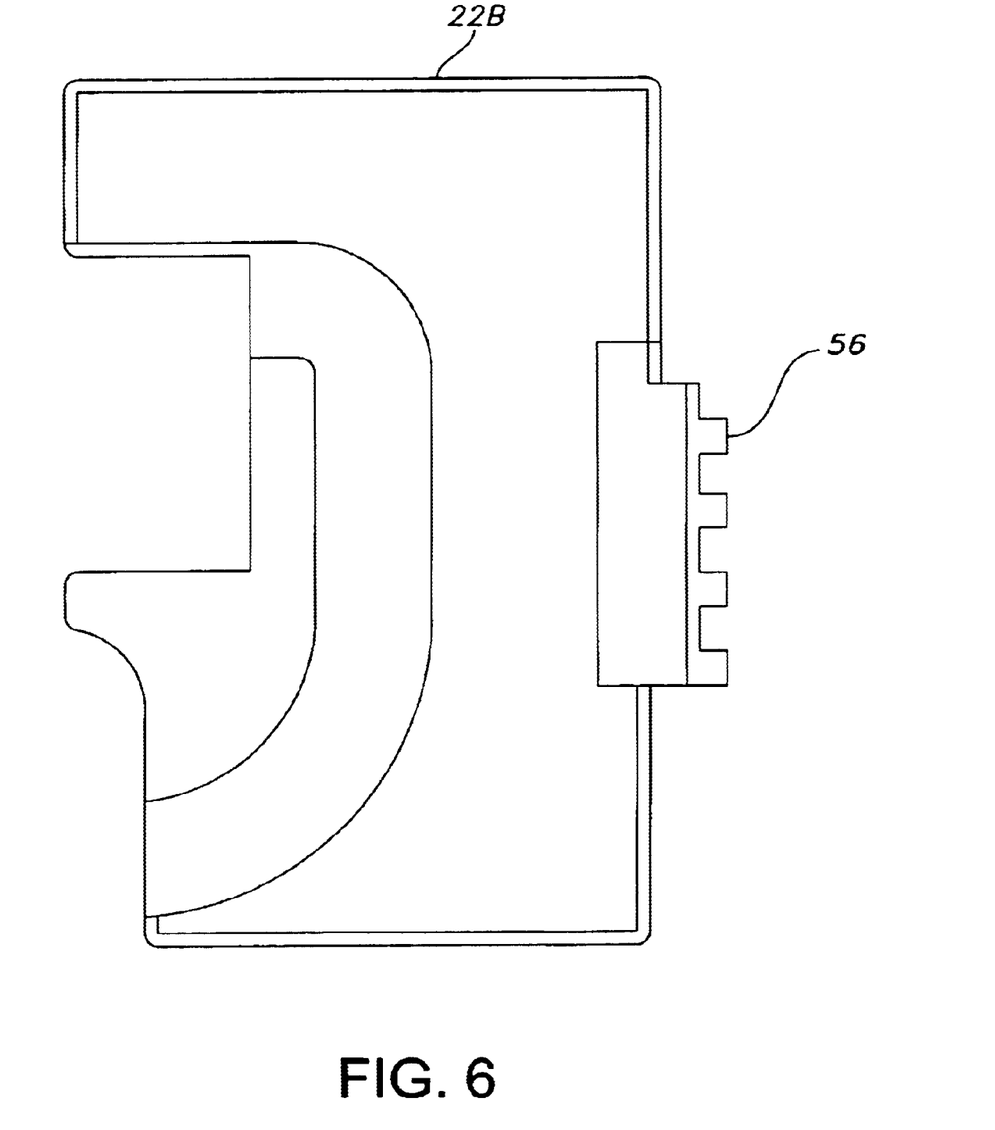
FIG. 6 is a plan view of a portion of the cover of FIG. 4 illustrating, principally, its teeth.
Figure 7:
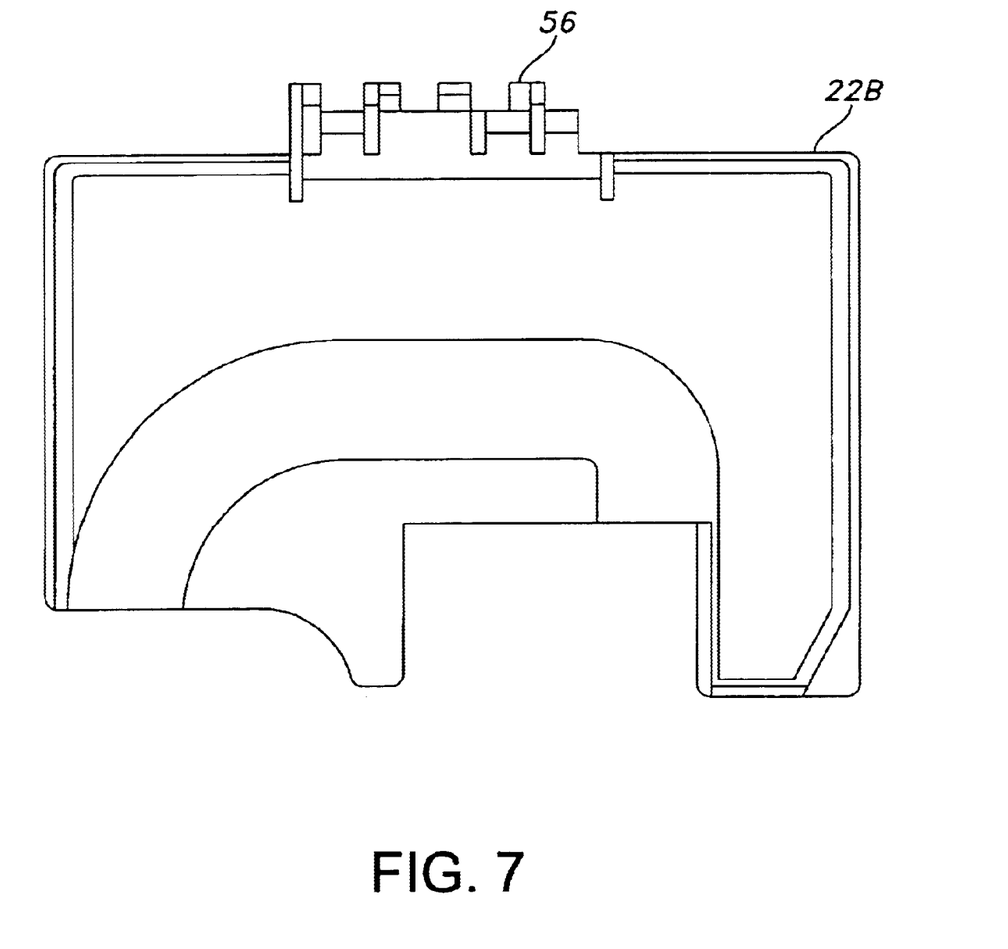
FIG. 7 is a plan view of a portion of the underside of the cover illustrated in FIG. 6.
Figure 8:
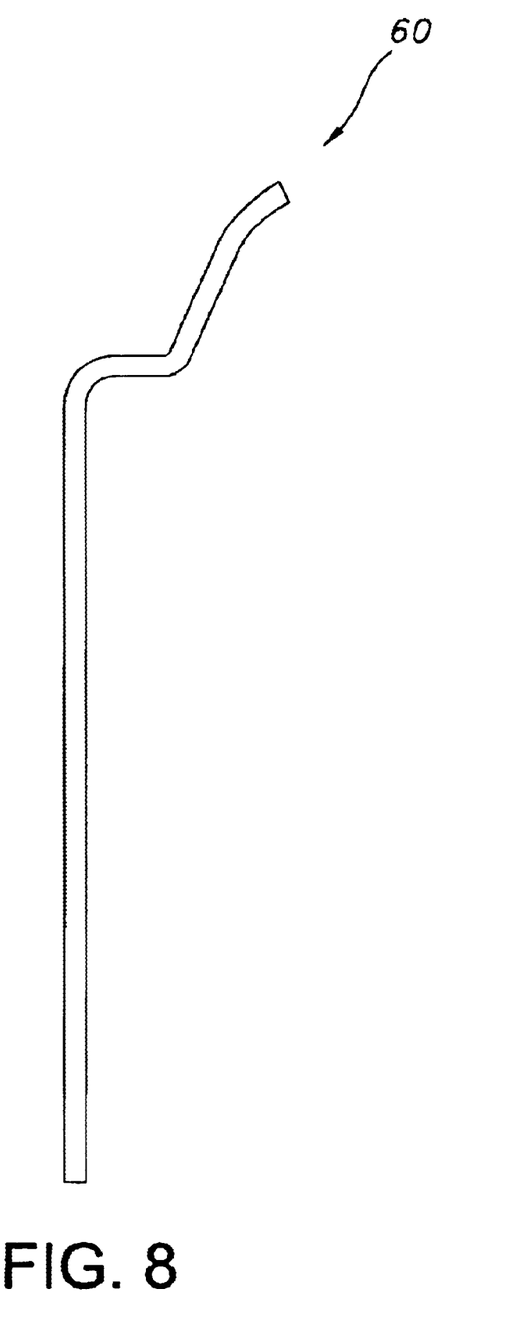
FIG. 8 is a side view of a curved blade of the stowage system of FIG. 1.

Illustrated in FIGS. 6–7 are, among other things, teeth 56 of section 22B. Although four such teeth 56 are detailed in FIGS. 6–7, other numbers of teeth may be employed instead. Additionally, teeth 56 need not be shaped or configured as shown in FIGS. 6–7; rather, any structure capable of bearing against curved spring blades 60 (or similar components) mounted onto casing 18 (see FIGS. 2 and 8) may be substituted.

When cover 22 is closed or not blocked open, teeth 56 are spaced between blades 60 and do not bear against them. After each section 22A or 22B is opened, however, that section 22A or 22B may be translated (nominally upward) along the axis coincident with axle 40 so as to cause teeth 56 to contact blades 60. By properly matching the force provided by blades 60 in this circumstance to that supplied by spring 36, the forces may counterbalance, overcoming the closing bias and blocking, or maintaining, the corresponding section 22A or 22B in its open state. Translating the section 22A or 22B back to its original position undoes contact between teeth 56 and blades 60, returning the closing bias to that section. Finally, if blades 60 are sufficiently flexible, their bending may allow teeth 56 to escape damage even when an attempt to close corresponding section 22A or 22B is made with teeth 56 and blades 60 engaged. Hence, any or all of blades 60 or equivalent structures may comprise means for blocking cover 22 in an open position.

The foregoing is provided for purposes of explaining exemplary embodiments of the present invention. Modifications to and adaptations of the described invention will be apparent to those skilled in the art and are within the scope and spirit of the following claims.

What is claimed is:

1. Equipment for storing breathing apparatus, comprising:
    a. an oxygen mask;
    b. a container defining an interior volume into which the oxygen mask is placed;
    c. a cover comprising first and second sections, each section attached directly or indirectly to the container, the first and second sections defining an opening through which a portion of the oxygen mask may protrude; and
    d. means for biasing the cover, when open, toward a position at least partially enclosing the interior volume.

2. Equipment according to claim 1 in which the biasing means comprises a first twisted spring having a static end and a dynamic end.

3. Equipment according to claim 2 in which the container has a casing, the static end of the first twisted spring contacts the casing, and the dynamic end of the first twisted spring contacts the cover.

4. Equipment according to claim 1 in which the oxygen mask is of the quick-donning type.

5. Equipment according to claim 4 further comprising a second twisted spring, the first twisted spring contacting the first section of the cover and the second twisted spring contacting the second section of the cover.

6. Equipment according to claim 5 further comprising a first axle about which the first twisted spring is positioned and a second axle about which the second twisted spring is positioned.

7. Equipment for storing breathing apparatus, comprising:
   a. a container defining an interior volume into which the breathing apparatus may be placed;
   b. a cover attached directly or indirectly to the container and (i) pivoting about an axis so as to open and close and (ii) translating along the axis so as to be latched in a substantially open condition; and
   c. means for latching the cover in the substantially open condition.

8. Equipment according to claim 7 in which the cover comprises a plurality of teeth.

9. Equipment according to claim 8 in which the latching means comprises a plurality of curved blades formed as part of or connected to the container.

10. Equipment according to claim 9 in which the plurality of teeth contact the plurality of curved blades, when the cover is translated along the axis, so as to maintain the cover in its substantially open position.

11. Equipment according to claim 10 further comprising means for biasing the cover toward its closed position.

12. Equipment according to claim 11 in which, when the plurality of teeth contact the plurality of curved blades, the closing bias provided by the biasing means is counterbalanced.

13. Equipment for storing breathing apparatus, comprising:
   a. a container defining an interior volume into which the breathing apparatus may be placed;
   b. a cover attached directly or indirectly to the container and (i) pivoting about an axis so as to open and close and (ii) translating along the axis so as to be blocked in an open condition; and
   c. means for blocking the cover in the open condition; and in which (i) the container has opposed first and second sides, (ii) the cover comprises first and second sections, (iii) the first section of the cover is connected to the first side of the container, and (iv) the second section of the cover is connected to the second side of the container.

14. Equipment according to claim 9 in which at least one of the plurality of curved blades is flexible.

* * * * *